(12) United States Patent  (10) Patent No.: US 7,748,632 B2
Coleman et al.  (45) Date of Patent: Jul. 6, 2010

(54) PORTABLE DATA TERMINAL AND BATTERY THEREFOR

(75) Inventors: Eric C. Coleman, Liverpool, NY (US); Colleen P. Gannon, Jordan, NY (US); Vincent Scott Garmon, Waxhaw, NC (US); Jonathan T. Grunow, Indian Trail, NC (US); Larry Keith Hooks, III, Charlotte, NC (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 490 days.

(21) Appl. No.: 11/459,770

(22) Filed: Jul. 25, 2006

(65) Prior Publication Data

US 2008/0123262 A1  May 29, 2008

(51) Int. Cl.
*G06K 7/10* (2006.01)
(52) U.S. Cl. .................. 235/472.01; 235/462.43
(58) Field of Classification Search ............ 235/462.43, 235/462.44, 46.45, 472.01
See application file for complete search history.

(56) References Cited

U.S. PATENT DOCUMENTS

| | | | |
|---|---|---|---|
| 4,709,318 A | 11/1987 | Gephart et al. | |
| 4,772,769 A | 9/1988 | Shumate | |
| 5,028,806 A | 7/1991 | Stewart et al. | |
| 5,133,076 A | 7/1992 | Hawkins et al. | |
| 5,167,024 A | 11/1992 | Smith et al. | |
| 5,268,823 A | 12/1993 | Yergenson | |
| 5,323,291 A | 6/1994 | Boyle et al. | |
| 5,347,622 A | 9/1994 | Takemoto et al. | |
| 5,410,141 A * | 4/1995 | Koenck et al. ......... | 235/472.02 |
| 5,602,456 A * | 2/1997 | Cargin et al. ............... | 320/112 |
| 5,680,633 A | 10/1997 | Koenck et al. | |
| 5,739,596 A | 4/1998 | Takizawa et al. | |
| 5,796,982 A | 8/1998 | Iwami et al. | |
| 5,805,474 A | 9/1998 | Danielson et al. | |
| 5,841,424 A | 11/1998 | Kikinis | |
| 5,844,400 A | 12/1998 | Ramsier et al. | |
| 5,960,344 A | 9/1999 | Mahany | |
| 5,977,901 A | 11/1999 | Fenner | |
| 6,005,767 A | 12/1999 | Ku et al. | |
| 6,006,118 A | 12/1999 | Stephenson | |
| 6,049,813 A | 4/2000 | Danielson et al. | |
| 6,119,935 A | 9/2000 | Jelen et al. | |
| 6,149,062 A | 11/2000 | Danielson et al. | |
| 6,191,503 B1 | 2/2001 | Kitten et al. | |
| 6,292,863 B1 | 9/2001 | Terasaki et al. | |
| 6,312,278 B1 | 11/2001 | Prior | |
| 6,326,543 B1 * | 12/2001 | Lamp et al. .................. | 174/546 |
| 6,460,769 B1 | 10/2002 | Knowles et al. | |
| 6,525,932 B1 | 2/2003 | Ohnishi et al. | |
| D473,186 S | 4/2003 | Grosfeld et al. | |
| 6,668,296 B1 | 12/2003 | Dougherty et al. | |
| D488,436 S | 4/2004 | Wulff | |
| 6,730,432 B1 | 5/2004 | Grosfeld et al. | |
| 6,799,719 B2 | 10/2004 | Peng | |

(Continued)

*Primary Examiner*—Thien M Le
(74) *Attorney, Agent, or Firm*—Roger P. Glass

(57) ABSTRACT

A portable data terminal including an elongated housing and a vertical grip. The housing has a battery well that extends traverse to a longitudinal axis of the housing. A battery pack has a longitudinal axis that, when seated in the battery well, extends traverse to a longitudinal axis of the housing, the battery pack having an integrated latch that engages a recess in the battery well.

26 Claims, 17 Drawing Sheets

U.S. PATENT DOCUMENTS

| | | |
|---|---|---|
| D503,673 S | 4/2005 | Rosengrant |
| D504,110 S | 4/2005 | Berentzen et al. |
| D512,427 S | 12/2005 | Choi et al. |

* cited by examiner

PORTABLE DATA TERMINAL AND BATTERY THEREFOR

BACKGROUND OF THE INVENTION

The term portable data terminal (PDT) refers to data collection devices used to collect, process, and transfer data to a larger data processing system. Most PDTs are ruggedized to some extent for use in industrial environments. The tougher the environment, the more robust the PDT. PDT's are available from several sources, including the assignee of the present application: HAND HELD PRODUCTS, INC.

A PDT generally comprises a mobile computer, a keypad, and a data acquisition device. The mobile computer generally comprises a hand held (or "pocket") computing device, such as those available from INTEL, PALM, HEWLETT PACKARD, and DELL. Keypads come in a variety of alpha-numeric and numeric configurations. The data acquisition device generally comprises a device that captures data from for example, radio frequency IDs (RFID), images, and bar codes. Data may also be captured via keypad entry and utilization of a touch pad associated with the mobile computer.

FIGS. 1A, 1B and 1C are views of a known PDT 100. The illustrated example utilizes a popular form factor incorporating a body 102 and a handle 101 (removed for clarity in FIG. 1C). The body 102 generally supports a variety of components, including: a battery 103; an LCD with associated touch screen 106; a keyboard 108 (including a scan button 108a); a scan engine 110; and a data/charging port 112 (not fully illustrated). The scan engine 110 may comprise, for example, an image engine or a laser engine. The data/charging port 112 typically comprises a proprietary (and often expensive) interface with one set of pins or pads for the transmitting and receiving of data and a second set of pins or pads for receiving power for powering the system and/or charging the battery.

The handle 101 extends from a bottom surface 118 of the body 102 thereby facilitating a vertical grip more suited for extended scanning sessions—as opposed to keypad data entry. Known handles, including the illustrated handle 101, incorporate a trigger 114 and a receptacle 116 (not fully illustrated) for receiving and retaining a stylus for activation of the touch screen 106.

The battery 103 generally comprises a housing, one or more cells, and associated circuitry. In the illustrated example, the housing of the battery 103 forms a portion of the surface of the body 102. The battery 103 has a longitudinal orientation matching the longitudinal axis of the body 102. The longitudinal orientation is the most prevalent orientation for handled PDTs as most are designed by simply adding a handle to an existing non-handled PDT. A necessary effect of such integration is that the length of the rear of the unit (e.g. that portion of the housing 102 extending behind the handle 101) is dictated by the length of the battery 103. The length and the weight of the battery can have considerable effect on the ergonomics of the PDT 100 and the satisfaction of users and buyers of such units.

In use, the user may actuate either the scan key 108a or the trigger 114 to initiate an image capture via the image engine 110. The captured image is analyzed. e.g. decoded. to identify the data it represents. The decoded data is stored and possibly displayed on the PDT 100. Additional processing of the data may take place on the PDT 100 and/or a data processing resource to which the data is transmitted via any available transport mechanism on the PDT 100. Some examples of known transport mechanisms utilized by PDT's include: Bluetooth, WiFi, GSM, CDMA, USB, IrDA, removable FLASH memory, parallel and serial ports (including for example, RS-232).

As noted, handled PDTs, such as the PDT 100, are usually designed by adding a handle onto an existing bar shaped PDT. In some instances, the handle is a user assembled after-the-fact accessory. This design approach leads to several undesirable ergonomic concessions. Accordingly, the present inventors have recognized a need for an improved handled portable data terminal.

BRIEF DESCRIPTION OF THE DRAWINGS

An understanding of the present invention can be gained from the following detailed description of the invention, taken in conjunction with the accompanying drawings of which.

DETAILED DESCRIPTION

Figure 1A:
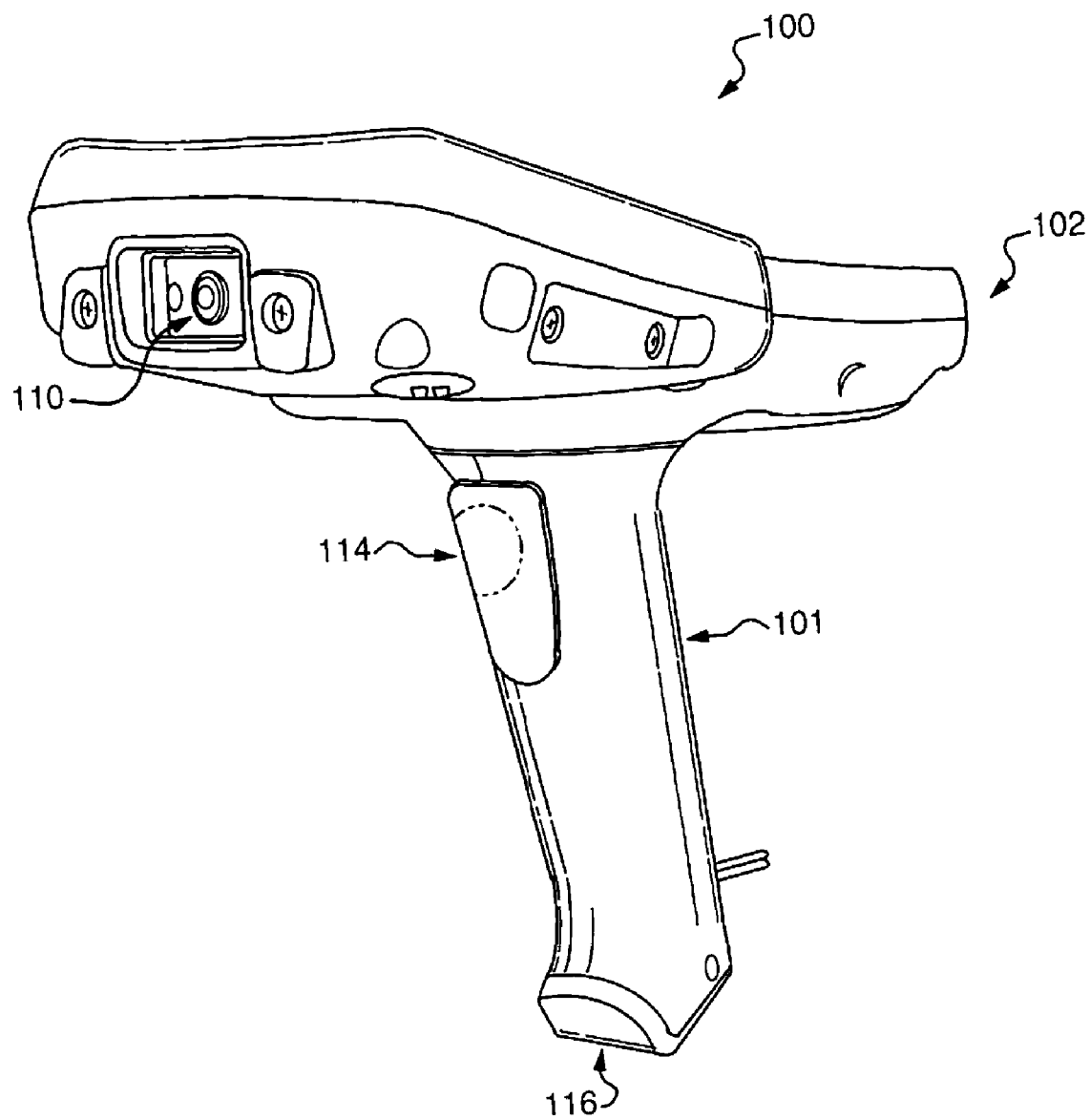
FIG. 1A is an orthogonal view of a known PDT.
Figure 1B:
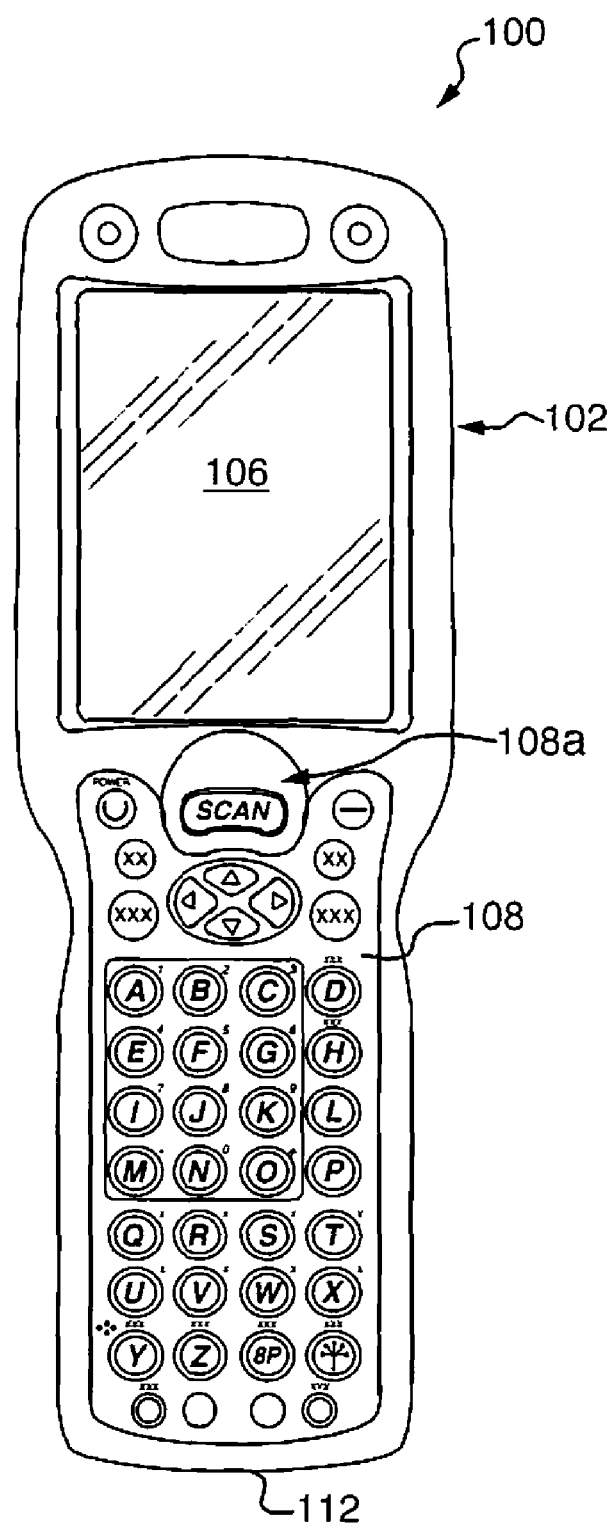
FIG. 1B is a top plan view of a known PDT.
Figure 1C:
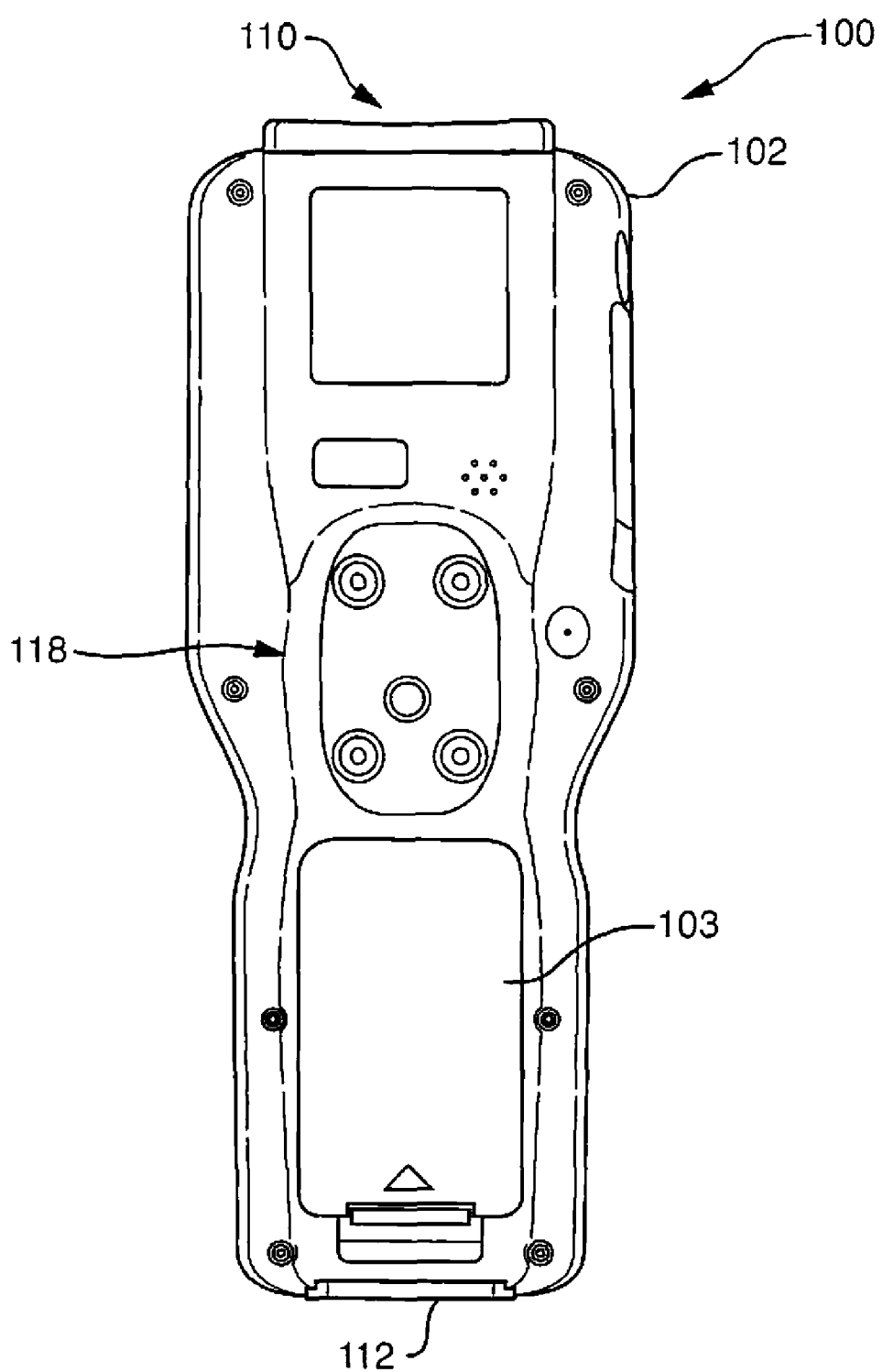
FIG. 1C is a bottom plan view of a known PDT

Reference will now be made in detail to the present invention, examples of which are illustrated in the accompanying drawings, wherein like reference numerals refer to like elements throughout. The following description will use nomenclature associated with a PDT, however those of ordinary skill in the art will recognize that the present invention is applicable to a variety of other portable devices including: personal data assistants (PDAs); bar code scanners; consumer electronics (including portable radios, televisions and phones); and the like. It is anticipated that many such portable devices would benefit from the present invention, including the embodiments thereof described herein. It is to be noted that an element number followed by a letter generally indicates multiple occurrences of similar, either in structure or function elements. Further, the use of an italicized "n" (e.g. n) associated with an element number generally denotes either an unspecified one of such elements or a partial or complete group of such elements—the meaning of which is to be drawn from the context of such use.

Figure 2:
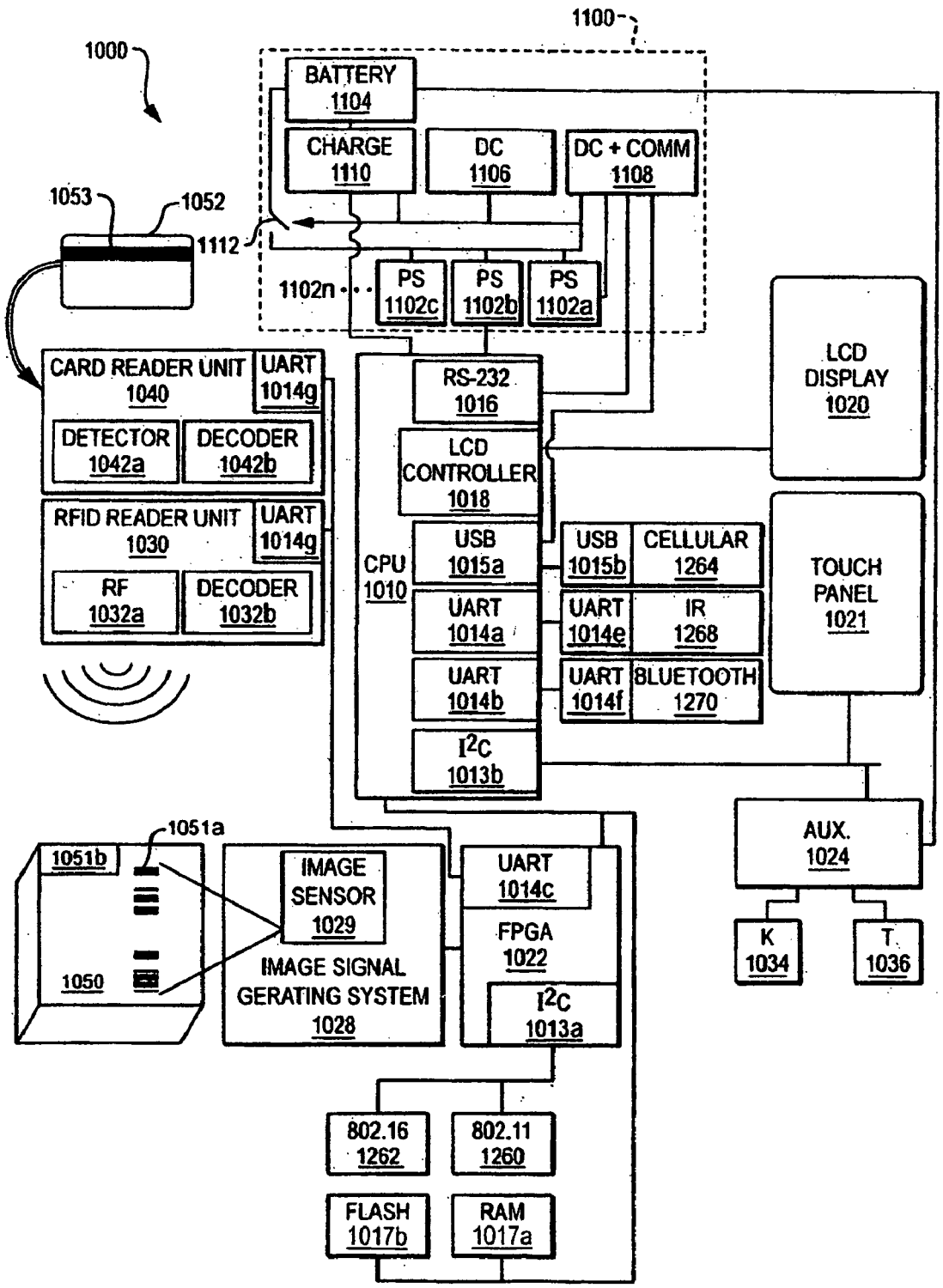
FIG. 2 is a block diagram of a PDT in accordance with an embodiment of the present invention.

FIG. 2 is a block diagram of a PDT 1000 in accordance with an embodiment of the present invention. Those of ordinary skill in the art will recognize that the illustrated design of the PDT 1000 has been simplified so as to permit a briefer explanation of systems and components not directly related to the present invention.

A central processing unit (CPU) 1010 receives data from and outputs data to other sub-systems for storage, transmission and additional processing. CPU 1010 may be implemented using any number of off the shelf solutions including: embedded processors, such as an XSCALE processor available from INTEL; general purpose processors, such as a PENTIUM 4 available from INTEL; or any number of custom solutions including pre-configured field programmable gate arrays (FPGAs) and application specific integrated circuits (ASICs). Overall operation of the CPU 1010 is controlled by software or firmware, typically referred to as an operating system, stored in one or more memory locations 1017n, including RAM 1017a and FLASH memory 1017b. Examples of suitable operating systems for PDT 1000 include graphical user interfaces such as WINDOWS MOBIL, WINDOWS CE, WINDOWS XP, LINUX, PALM, and OSX.

In general, communication to and from the CPU 1010 and among the various sub-components takes place via one or more ports or busses, including a main system bus 1012: I²C busses 1013a and 1013b; a plurality of Universal Asynchronous Receivers/Transmitter (UART) ports 1014n, a Universal Serial Bus (USB) 1015n, and an RS-232 port 1016.

The illustrated CPU 1010 also includes a liquid crystal display (LCD) controller 1018 for controlling an LCD 1020. A touch sensitive panel 1021, which may be in communication with one or more of the CPU 1010 and an auxiliary processor 1024 via the I²C bus 1013b, may be associated with the LCD 1020 for receipt of data thereon. The combination of the LCD 1020 and the touch sensitive panel 1021 is often referred to as a "touch screen."

A variety of secondary processors may be provided to perform general and application specific functions. The example illustrated in FIG. 2 provides two such processors: a field programmable gate array (FPGA) 1022 and the auxiliary processor 1024. The FPGA 1022 may comprise any number of FPGA including the Virtex-4 family of FPGAs available from XILINX. The auxiliary processor 1024 may comprise any number of embedded (or general purpose) processors, including the PlCmicro® family of microcontrollers available from MICROCHIP TECHNOLOGY.

The auxiliary processor 1024 may interface with and control a variety of data input devices including, for example, the touch panel 1021, a keyboard 1034 and a trigger 1036. By way of example, the PDT 1000 may be configured so that displayed menu options are selected by physically depressing a key on the keyboard 1034 or activating the touch screen 1021 with use of a finger or stylus. The trigger 1036 may be used for initiating and controlling the various data collection systems, such as an image signal generating system 1028, an RFID sensing system 1030, or a magnetic stripe reader 1040.

The data collection systems (e.g. the image signal generating system 1028, the RFID sensing system 1030, and the magnetic stripe reader 1040) may be controlled by one or more of the CPU 1010, the auxiliary processor 1024, and the FPGA 1022. In this case, the FPGA 1022 initiates and controls the operation of the data collection systems and accumulates data received prior to depositing such data in memory 1017n. Possible configurations of FPGA 1022 are illustrated in U.S. Pat. No. 6,947,612 incorporated herein by reference.

The image signal generating system 1028 generally comprises a two dimensional solid state image sensor 1029 utilizing such technologies as CCD, CMOS, and CID, for capturing an image containing data, e.g. a bar code or signature. Two-dimensional solid state image sensors generally have a plurality of photo sensor picture elements ("pixels") which are formed in a pattern including a plurality of rows and a plurality of columns of pixels. The image signal generating system 1028 further includes an imaging optics (not shown) focusing an image onto an active surface of the image sensor 1029. Image sensor 1029 may be incorporated on an image sensor IC chip having disposed thereon image sensor control circuitry image signal conditioning circuitry, and an analog-to-digital converter. FPGA 1022 manages the capture and transfer of image data into RAM 1017n. Decoding may be performed by the CPU 1010 or any suitable secondary processor. Examples of devices suitable for use as the imaging assembly 1028 include an IMAGETEAM 5x00VGA/5x00MPX imaging module of the type available from Hand Held Products, assignee of the present application. A variety of alternatives, including dedicated laser barcode scanners may also be utilized.

One use model of the image signal generating system 1028 is for reading and interpreting bar codes such as bar code 1051a on an item 1050. In this mode, when the trigger 1036 is actuated, the CPU 1010 causes the appropriate control signals to be sent to the image sensor 1029. In response thereto, the image sensor 1029 outputs digital image data including a representation of the bar code symbol 1051a. The digital image data is streamed to the FPGA 1022 where it is collected and subsequently deposited in memory 1017n. In accordance with a decoding program (not specifically illustrated) an attempt may be made to decode the bar code represented in the captured electronic image representation. The capture and decoding of image data may occur automatically in response to a trigger signal being generated, usually by activation of the trigger 1036 or a pre-selected key on keyboard 1034. For example, the CPU 1010 may be configured, typically through execution of a program resident in memory 1017n, to continuously capture and decode bar code symbols represented therein as long as trigger 1036 is actuated. The cycle may be terminated upon successfully decoding the bar code symbol or by timing out after a number of unsuccessful attempts.

In addition to having a decode mode of operation, the image signal generation system 1028 may also be configured for an image capture mode of operation. In an image capture mode of operation, control circuit 1010 captures an electronic image representation in response to the trigger 1036 being actuated without attempting to decode a decodable symbol represented therein. The captured electronic image representation may be one or more of (i) stored into a designated memory location of memory 1017n, (ii) transmitted to an external spaced apart device, or (iii) displayed on LCD 1020. This mode may be used to capture, for example an image of a signature or damage to a package.

The RFID reader unit 1030 includes an RF oscillation and receiver circuit 1032a and a data decode processing circuit 1032b. RFID reader unit 1030 may be configured to read RF encoded data from a passive RFID tag, such as tag 1051b, which may be disposed on article 1050.

Where the RFID leader unit 1032a is configured to read RP encoded data from a passive RFID tag, the RF oscillation and receiver circuit 1032a transmits a carrier signal to the passive tag which in turn converts the carrier energy to voltage form and actuates a transponder not shown) to transmit a radio signal representing the encoded tag data. The RF oscillator and receiver circuit 1032*a*, in turn, receives the radio signal from the tag and converts the data into a digital format. The data decode processing circuit 1032*b*, typically including a low cost microcontroller IC chip, decodes the received radio signal information received by RF oscillator and receiver circuit 1032*a* to decode the encoded identification data originally encoded into RFID tag 1051*b*.

RFID reader unit 1030 may, for example, operate in a selective activation mode or in a continuous read operating mode. In a selective activation mode, RFID reader unit 1030 broadcasts radio signals in an attempt to activate a tag or tags in its vicinity in response to an RFID trigger signal being received. In a continuous read mode, RFID reader module 1030 continuously broadcasts radio signals in an attempt to actuate a tag or tags in proximity with the unit automatically, without module 1030 receiving a trigger signal. POT 1000 may be configured so that the CPU 1010 recognizes a trigger signal under numerous conditions, such as: (1) the trigger 1036 is actuated; (2) an RFID trigger instruction is received from a remote device; or (3) the CPU 1010 determines that a predetermined condition has been satisfied.

Still further, the PDT 1000 may include a card reader unit 1040 for reading data from a card 1052. Card reader unit 1040 generally comprises a signal detection circuit 1042*a* and a data decode circuit 1042*b*. In operation, the signal detection circuit 1042*a* detects data, from for example a magnetic strip 1053 on a card 1052. Subsequently, the data decode circuit 1042*b* decodes the data. The decoded data may be transmitted to the CPU 1010 for further processing via the FPGA 1022. The card reader unit 1040 can be selected to be of a type that reads card information encoded in more than one data format. For example, the card reader unit 1040 may comprise a Panasonic ZU-9A36CF4 Integrated Smart Reader capable of reading any one of magnetic stripe data, smart card or Integrated circuit card (IC card) data, and RF transmitted data.

A power circuit 1100 supplies power to the PDT 1000. The power circuit 1100 generally comprises a series of power supplies 1102*n* that regulate the power supplied to the various components of the PDT 1000. The power supplies 1102*n* each generally comprise step up or step down circuits which are in turn connected to each of the various components in the PDT 1000 that require the particular voltage output by that power supply 1102*n*.

The power supplies receive current from a power bus 1103 which is, in turn, supplied by one of a battery 1104, a first power input 1106 or a connector 1108 that includes a second power input. The first power input 1106 may comprise a DC power jack, for example, a 2.5 mm coaxial DC power plug which receives 9.5 volts from a conventional AC/DC transformer. The connector 1108 may comprise any number of known connection technologies, such as the D Series of circular plastic connectors or the HCL D-sub derivative design data transfer connector available from HYPERTRONICS, INC. Certain pins of the connector 1108 may be dedicated to receiving DC power, for example 9.5 volts, while other pins are dedicated to one or more communication paths, e.g. RS-232 and USB. It may also prove advantageous to provide DC power out, for example from a power supply 1102*a*, so as to power tethered accessories, such as external magnetic stripe or RFID readers (not shown). It may prove further advantageous to add circuitry to insulate the first power input 1106 from the second power input on the connector 1108 and other components in the PDT 1000 in the event that a user attempts to supply power to both power inputs.

The battery 1104 may be selected from any of a variety of battery technologies including NiMh, NiCd, Li Ion, or Li Polymer. The battery 1104 is charged by a charge circuit 1110 which receives power from either the first power input 1106 or the second power input on the connector 1108. The charge circuit may comprise any of a number of available circuits. In the example shown in FIG. 2, control is provided to the CPU 1010 which may modify the charging behavior of the charge circuit 1110 based on information generated by the auxiliary processor 1024. In this example, the auxiliary processor 1024 monitors battery chemistry, such as gas content, via known interfaces, such as the SMART battery interface as specified by the Smart Battery System Implementers Forum. A switch 1112 isolates the battery based upon the presence of power from the first power input 1106 or the second power input on the connector 1108. Thus, when an external power supply is connected to either the power input 1106 or the second power input on the connector 1108, the battery is isolated from the power supplies 1102*n* and may be charged via the charge circuit 1110. Once power is removed from the power input 1106 and the connector 1108, the battery is connected to the power supplies 1102*n*.

The PDT 1000 may further include a plurality of wireless communication links such as an 802.11 communication link 1260, an 802.16 communication link 1262, a communication link 1264 for communication with a cellular network such as a network in accordance with the Global System for Mobile Communications (GSM), an IR communication link 1268, and a Bluetooth communication link 1270. Each of these links facilitates communication with a remote device and may be used to transfer and receive data.

Figure 3:
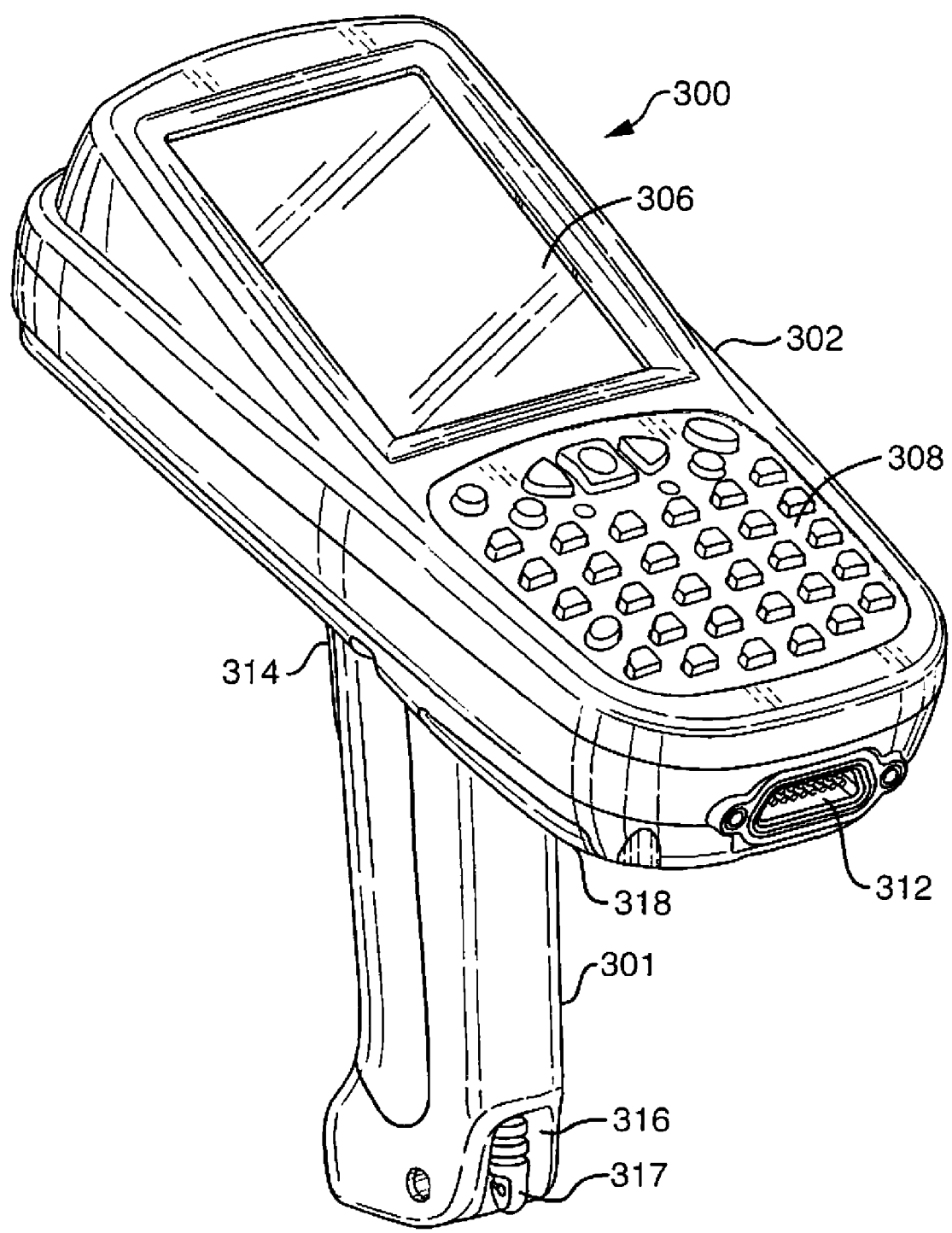
FIG. 3 is an isometric view of a PDT in accordance with an embodiment of the present invention.
Figure 4:
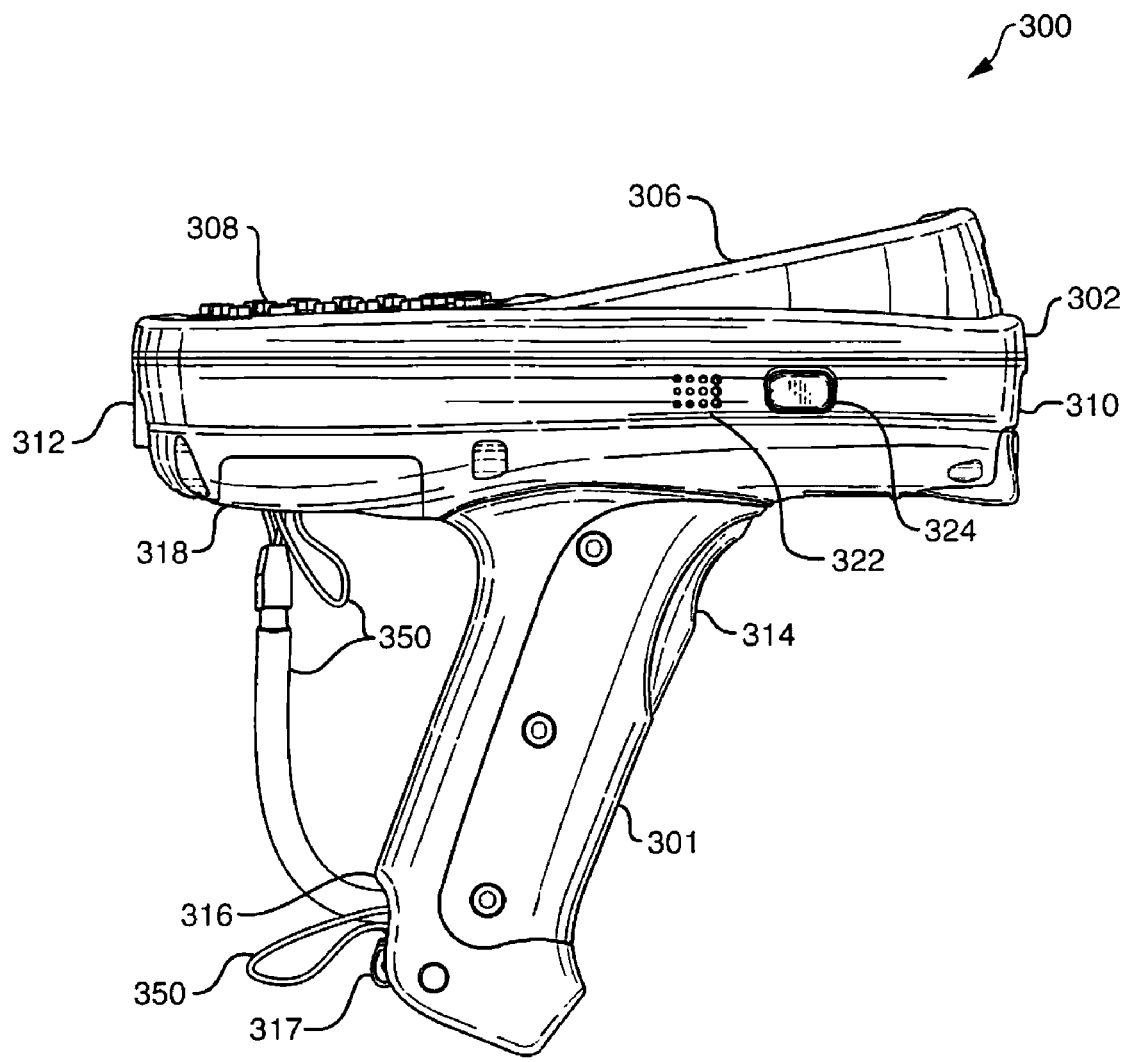
FIG. 4 is a side view of a PDT in accordance with an embodiment of the present invention.

FIG. 3 is an isometric view of PDT 300 in accordance with an embodiment of the present invention. FIG. 4 is a side view of PDT 300 in accordance with an embodiment of the present invention. The PDT 300 generally comprises a body 302 and a handle 301.

The body 302 generally supports a variety of components, including: a battery (not shown) secured by a battery access panel 318; an LCD with touch screen 306; a keyboard 308: a scan engine 310 (not fully illustrated): and a data/charging port 312. The scan engine 310 may comprise, for example, an image engine or a laser engine. The data/charging port 312 typically comprises a mechanical interface with one set of pins or pads for the transmitting and receiving of data and a second set of pins or pads for receiving power for powering the system and/or charging the battery. The body may also be provided with speaker holes 322 and a window 324 for IrDA communication.

The handle 301 extends from a bottom surface of the body 302 thereby facilitating a vertical grip. The handle 301, incorporates a trigger 314 and a receptacle 316 for receiving and retaining a stylus 317. A strap 350 may be provided to connect the battery access panel 318 with the bottom of the handle 301. The Strap 350 may prevent a user from dropping the PDT 300 and may also reduce instances of lost battery access panels 318.

Figure 5:
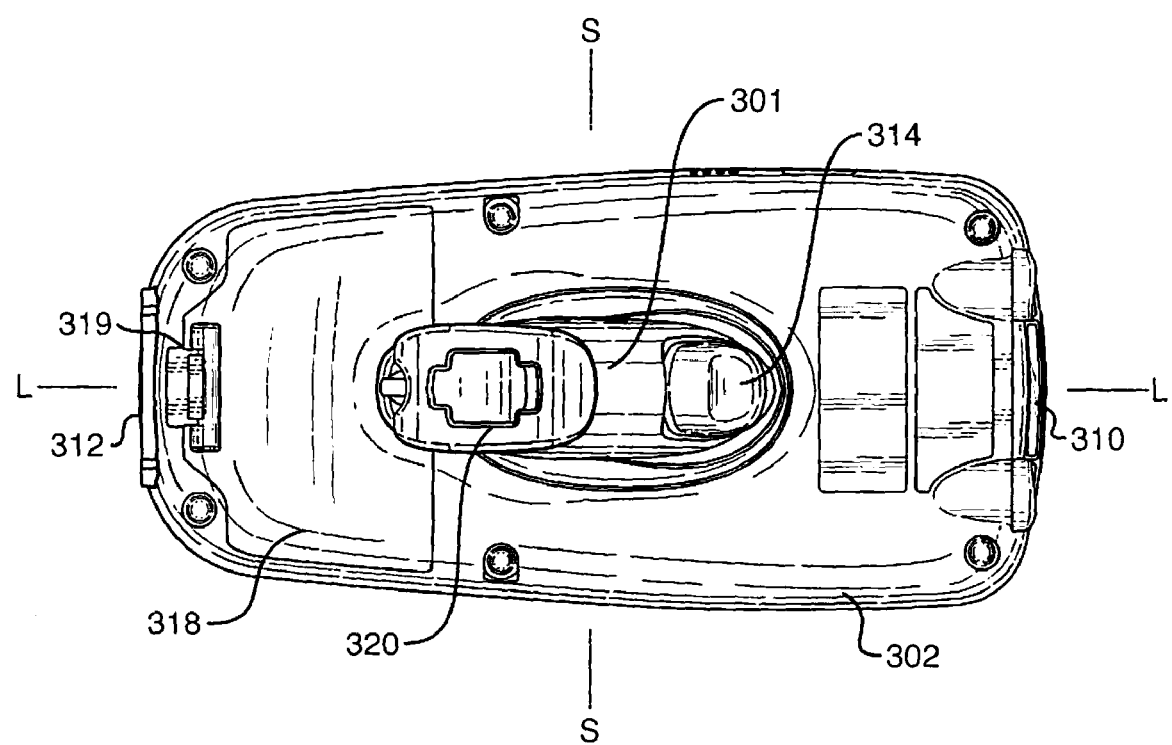
FIG. 5 is a bottom view of a PDT in accordance with an embodiment of the present invention.
Figure 6:
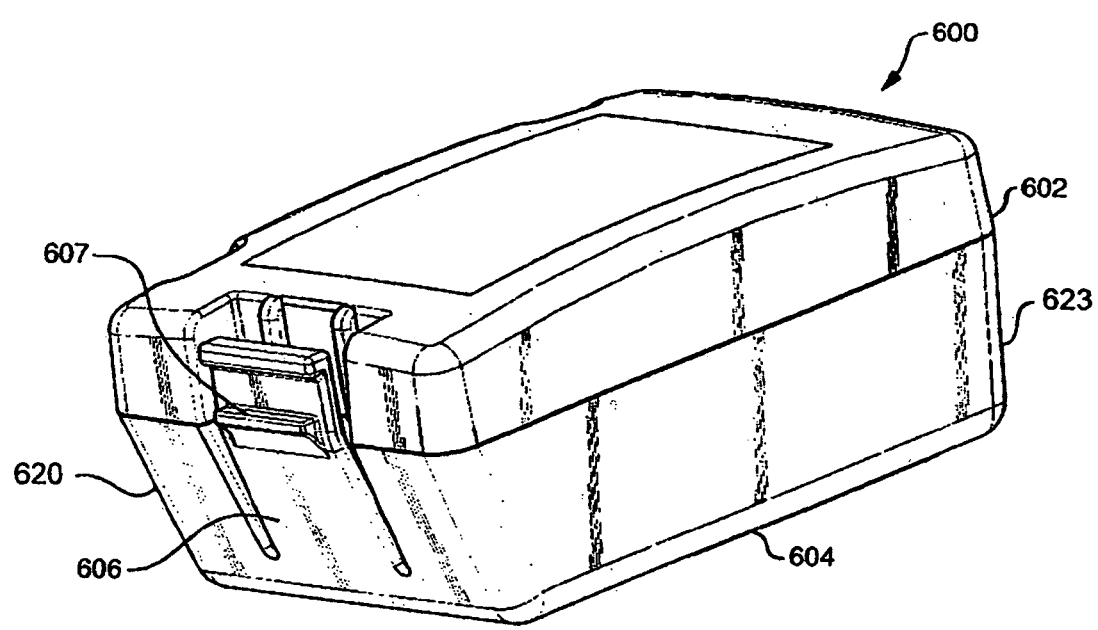
FIG. 6 is an isometric view of a battery in accordance with an embodiment of the present invention.
Figure 7:
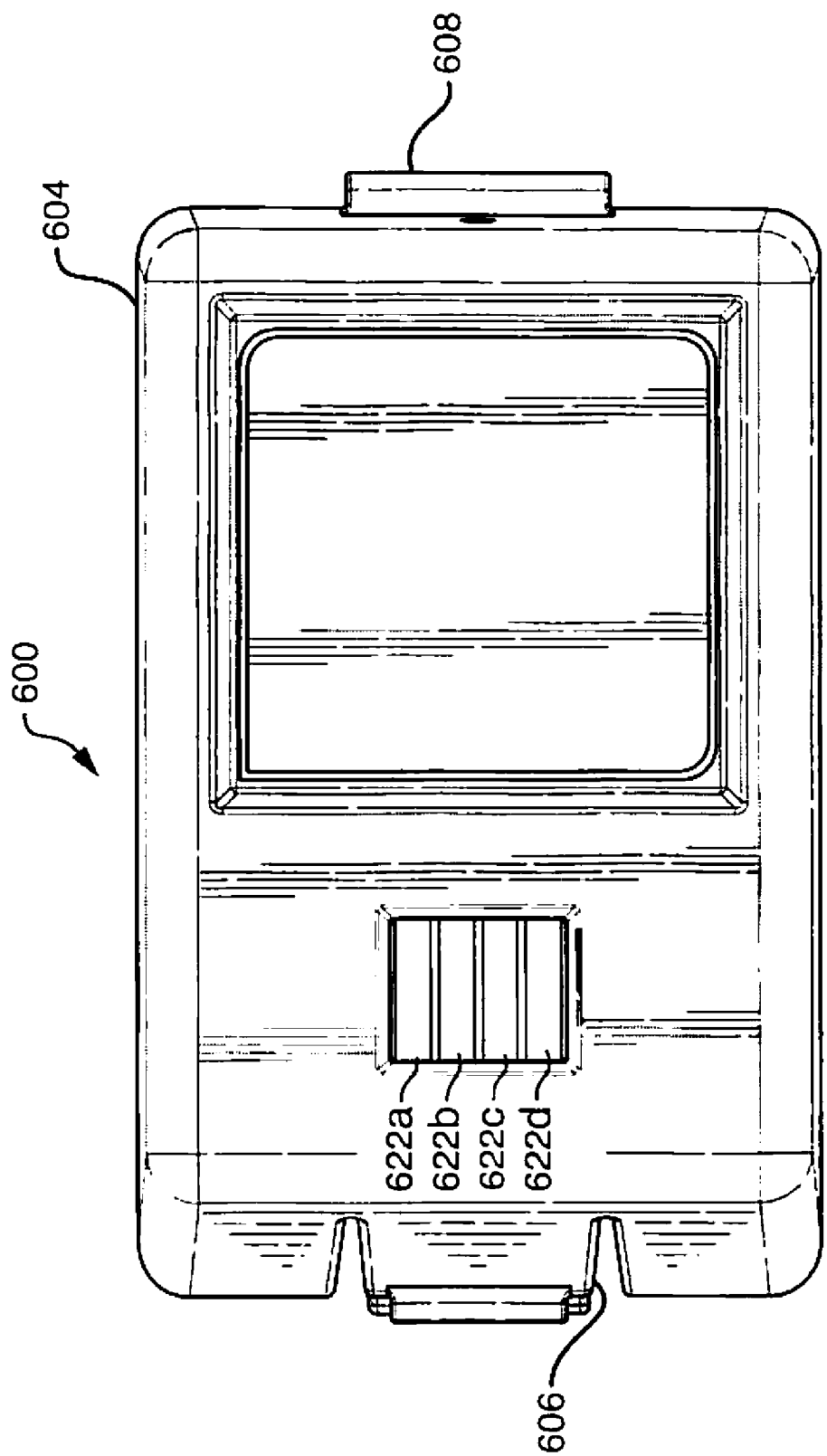
FIG. 7 is a bottom view of a battery in accordance with an embodiment of the present invention.
Figure 8:
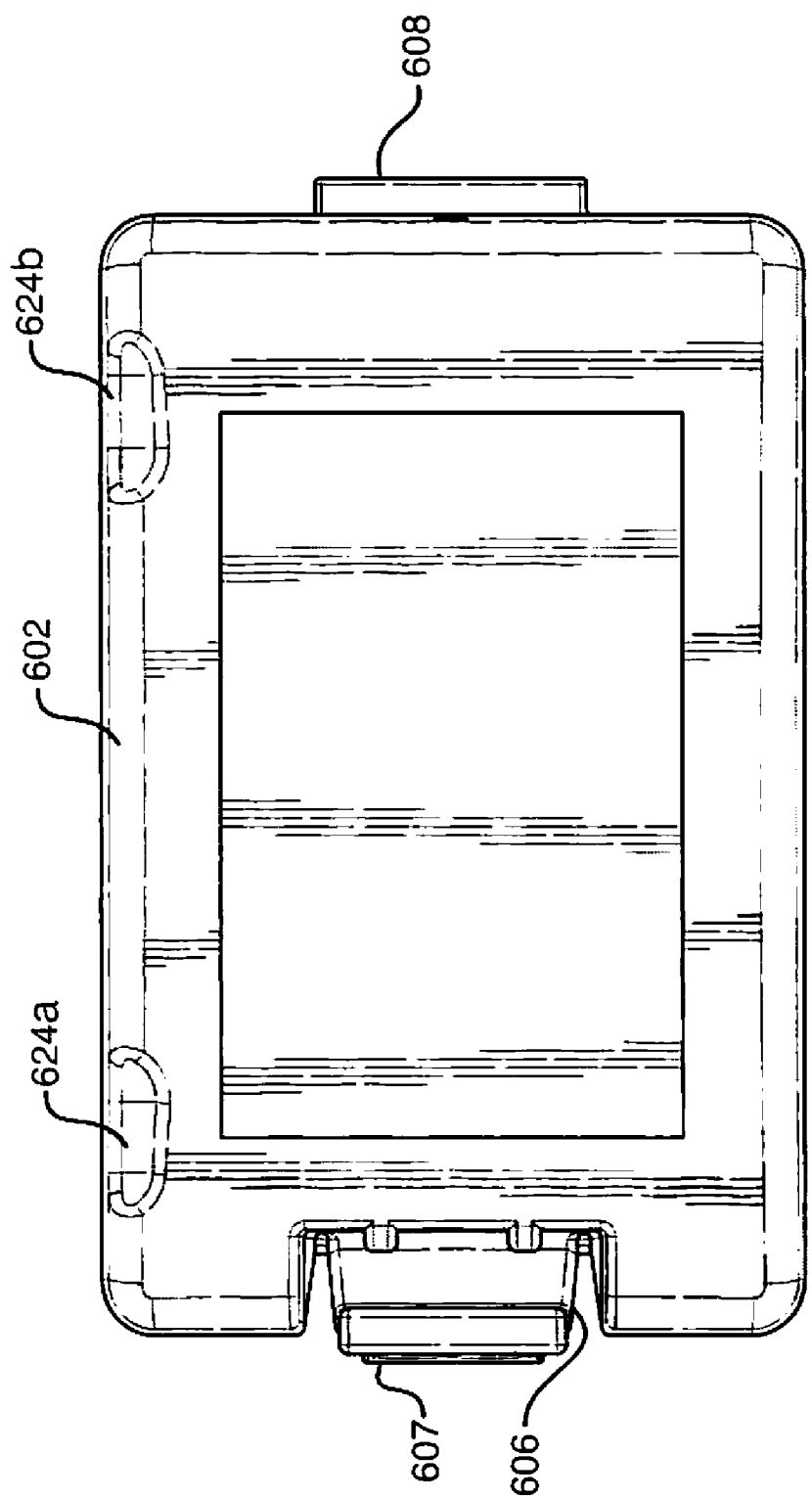
FIG. 8 is a top view of a battery in accordance with an embodiment of the present invention.

FIG. 5 is a bottom view of PDT 300 in accordance with an embodiment of the present invention. The length and the weight of the battery can have considerable effect on the ergonomics of a PDT and the satisfaction of users and buyers of such units. In the present embodiment, the battery access panel 318 extends across a short axis S of the body 302 transverse to the long axis L. The battery access panel 318 is secured by an integrally molded latch 319. The traverse orientation of the battery allows the shortening of the body 302 while facilitating creation of a center of balance of the PDT 300 at or near the intersection of the body 302 and the handle 301.

FIGS. 6 through 9 present a variety of views of a battery 600 in accordance with an embodiment of the present invention. The battery 600 generally comprises a collection of cells and electrical components (described hereinafter) secured within a housing comprising a first half 602 and a second half 604. The two halves 602 and 604 are joined using, for example, ultrasonic welding or adhesive. The second half 604 incorporates an integrally molded latch 606. The latch generally comprises a flexible tab with a protrusion 607 that, when the battery 600 is inserted into the PDT 300, engages a ledge (formed, for example, by defining a recess in a corresponding surface) to secure the battery in the PDT 300. A protrusion 608 on the opposite side of the battery 600 from the integral latch 606 also engages a ledge (formed, for example, by defining a recess in a corresponding surface) when the battery 600 is inserted into the PDT 300. The first half 602 of the battery 600 is provided with two reliefs 624a and 624b which allow tabs on the battery access panel 318 to be inserted into corresponding reliefs on the body 302.

The battery 600 may be shaped to facilitate orientation of the battery upon insertion into the PDT 300. In the illustrated example, the second half 604 has a first end 620 sloped at an obtuse angle to the bottom surface and a second end 623 extending nearly perpendicular to the bottom surface. By reciprocally shaping a battery well on the PDT 300, the battery 600 will only fully seat if inserted in the correct orientation. This will ensure that electrical contacts 622n, exposed on the bottom surface of the half 604, will align with corresponding contacts 1208 in the battery well. The electrical contacts 622n may be surrounded by a gasket to provide water resistance to the battery 600. This reduces the need to make the interface between the battery door 318 and the lower half 302 water resistant.

Figure 10:
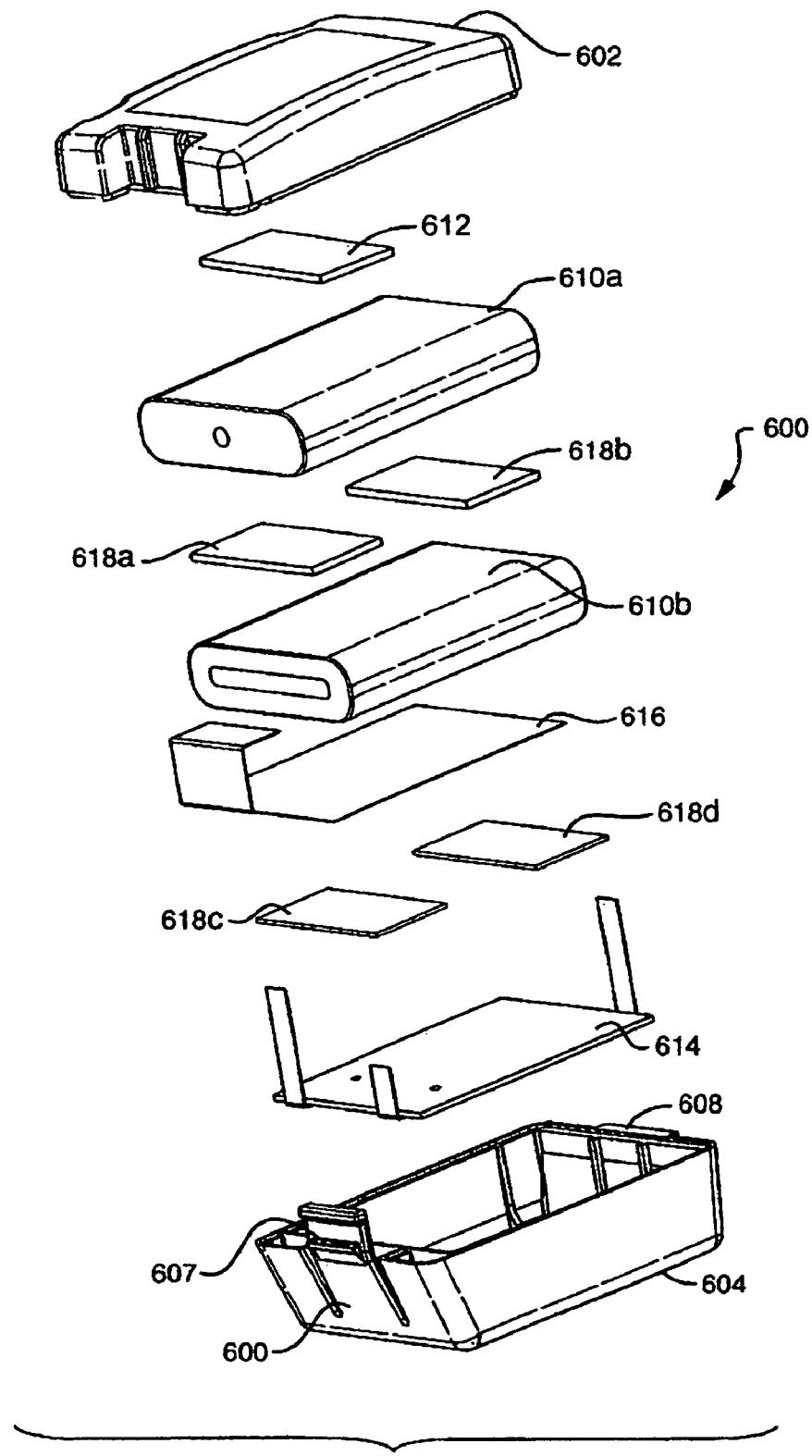
FIG. 10 is an exploded view of a battery in accordance with an embodiment of the present invention.
Figure 11:
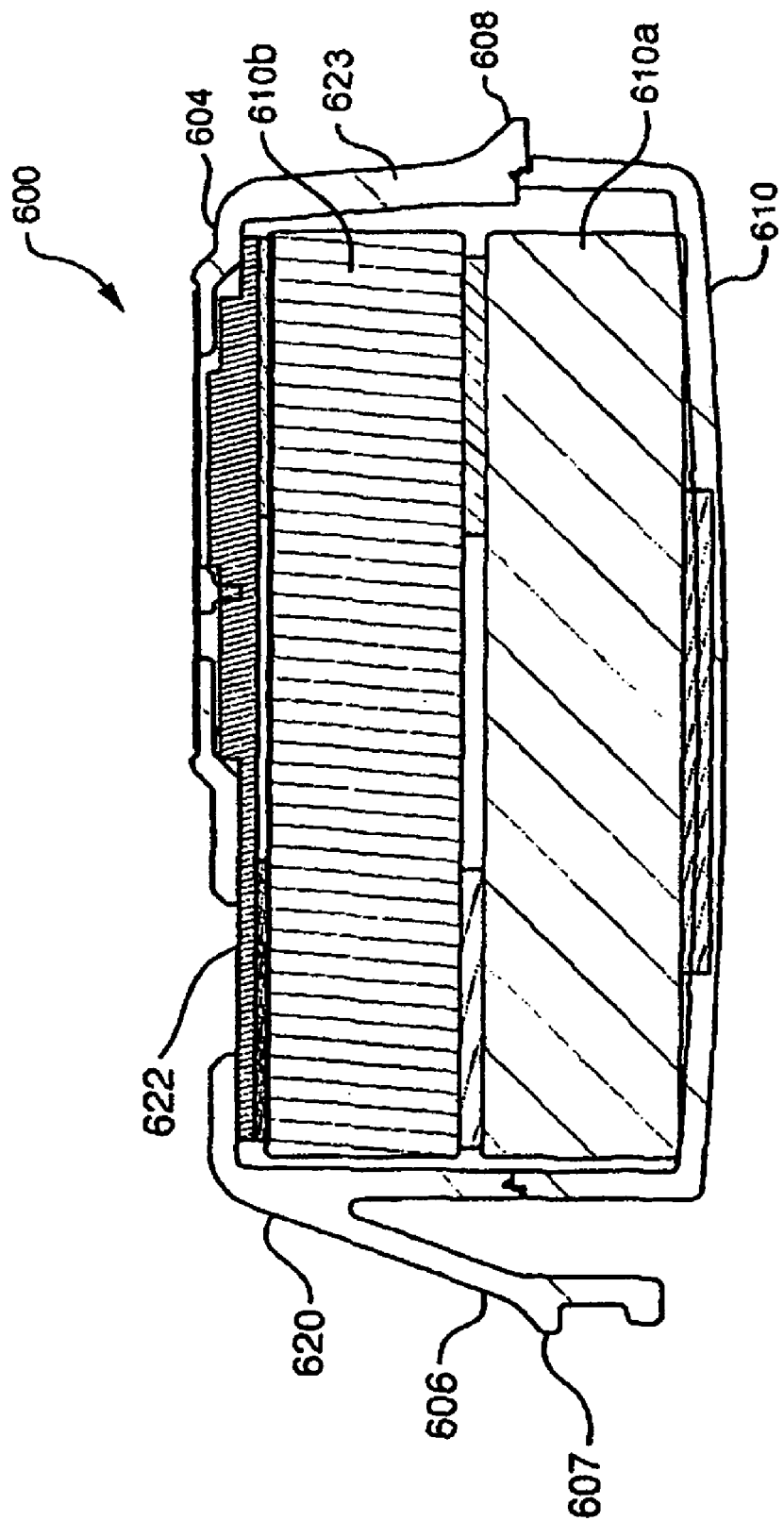
FIG. 11 is a cross-sectional view of a battery in accordance with an embodiment of the present invention.

FIG. 10 is an exploded view of a battery 600 in accordance with an embodiment of the present invention. FIG. 11 is a cross-sectional view of a battery in accordance with an embodiment of the present invention. The battery 600 generally comprises two cells 610a and 610b which are connected by two pieces of adhesive tape 618a and 618b. The cells are in turn affixed to the first half 602 of the battery 600 by adhesive tape 612. A fish paper insulator 616 is applied to the second cell 610b. A printed circuit board 614 is affixed to the fish paper insulator with adhesive tape 618c and 618d. The printed circuit board is provided with straps that may be welded to the cells 610a and 610b to provide conductivity and additional strength.

Figure 12:
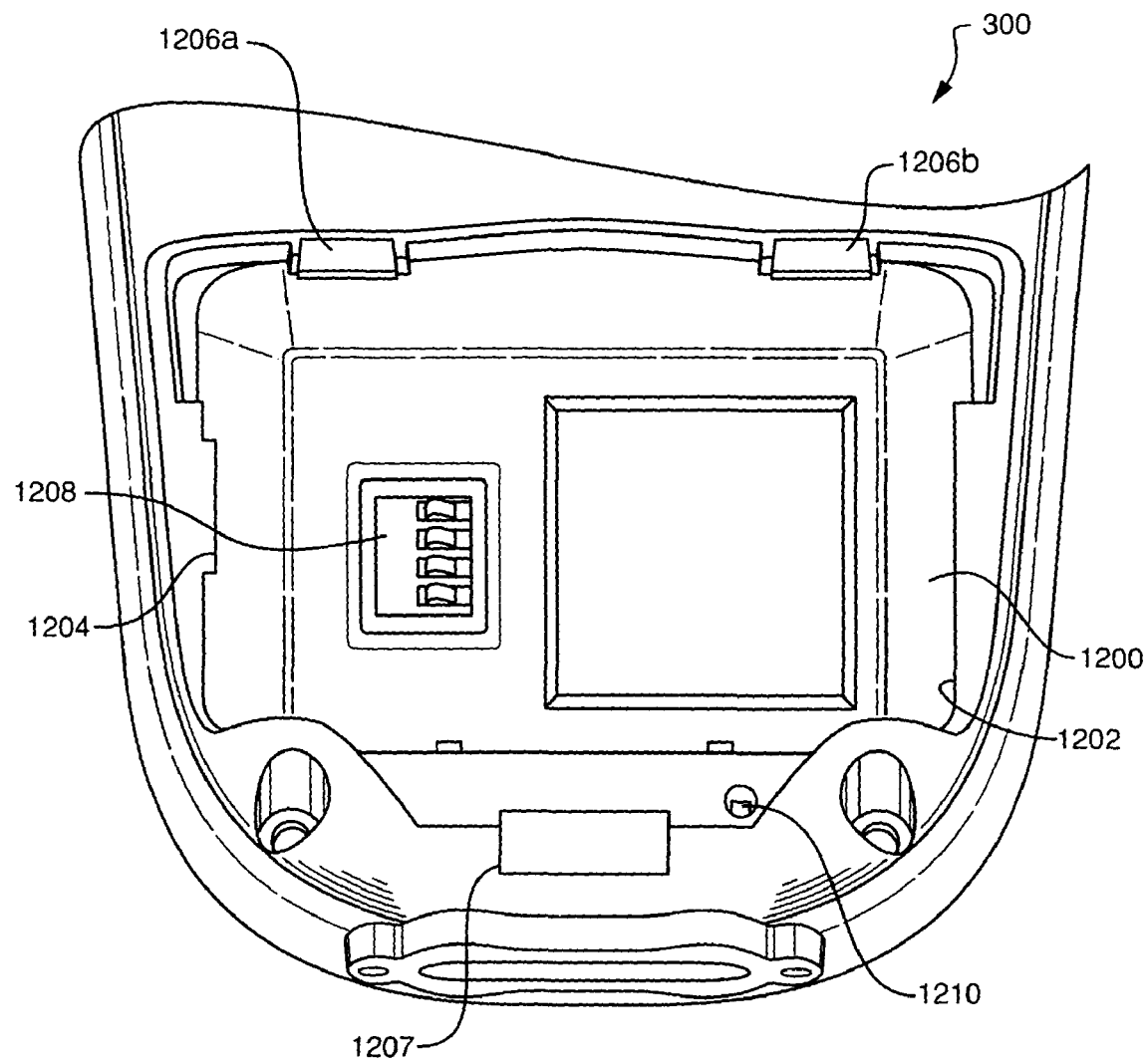
FIG. 12 is a partial bottom view of a PDT in accordance with an embodiment of the present invention.

FIG. 12 is a partial bottom view of a PDT 300 in accordance with an embodiment of the present invention. In particular, a battery well 1200 is illustrated. The battery well 1200 generally conforms to the shape of the battery 600 (including any slopes thereon) and includes a variety of ledges and recesses that are used to secure the battery 600 and battery access panel 318. In particular a first ledge 1202 is provided to engage the protrusion 608 while a second ledge 1204 is provided to engage the protrusion 607 on the latch 606. A pair of recesses 1206a and 1206b are provided to engage protrusions on the battery access panel 318. Another ledge 1207 is provided to receive a protrusion on the latch of the battery access panel 318.

Electrically, an array of contacts 1208 and a switch 1210 are provided in the well 1200. The array of electrical contacts 1208 are situated on the floor of the well 1200. The electrical contacts 1208 may be spring biased to ensure adequate communication with the electrical contact 622n. The switch 1210 is engaged by a portion of the battery access panel 318. The switch 1210 may have a variety of configurations, for example it may utilize similar mechanical components as a keypad or comprise a variety of detection circuits, e.g. mechanical, optical or magnetic. The function of the switch 1210 is to provide an indication when the battery access panel 1210 is removed. This indication may be used for a variety of functions including conducting an orderly shutdown in preparation for the removal of the battery 600.

Requiring the sequential actuation of two latches (one on the battery 600 and one on the battery access panel 318) to remove the battery 600 means that a certain amount of time will elapse between the start of removal of the battery access panel 318 and the electrical disconnection of the battery 600 from the PDT 300. Through testing, it has been determined that the amount of time taken using the illustrated configuration is enough to perform an orderly shut down of the PDT 300 thereby avoiding corruption of data and the risk of rendering the PDT 300 inoperable. Mechanically, this permits the PDT 300 to be designed without the typical shut-down capacitor (or with the use of reduced shut-down capacitor).

As a further feature, the well 1200 may be molded to have a limited number of egress points—to provide water resistance. In particular, the example well 1200 illustrated in FIG. 12 has two holes: a first hole associated with the contacts 1208 and a second hole associated with the switch 1210. Gaskets may be associated with each hole to render the well 1200 resistant to water. An additional hole may be provided to provide access to a reset switch. This hole may be sealed with tape or the like to increase water resistance while still providing emergency access. By making the well 1200 water resistant, and making the battery 600 water resistant, the interface between the battery access panel 318 and the well 1200 need not be made water resistant. This may reduce the cost and complexity of the PDT 300.

Figure 9:
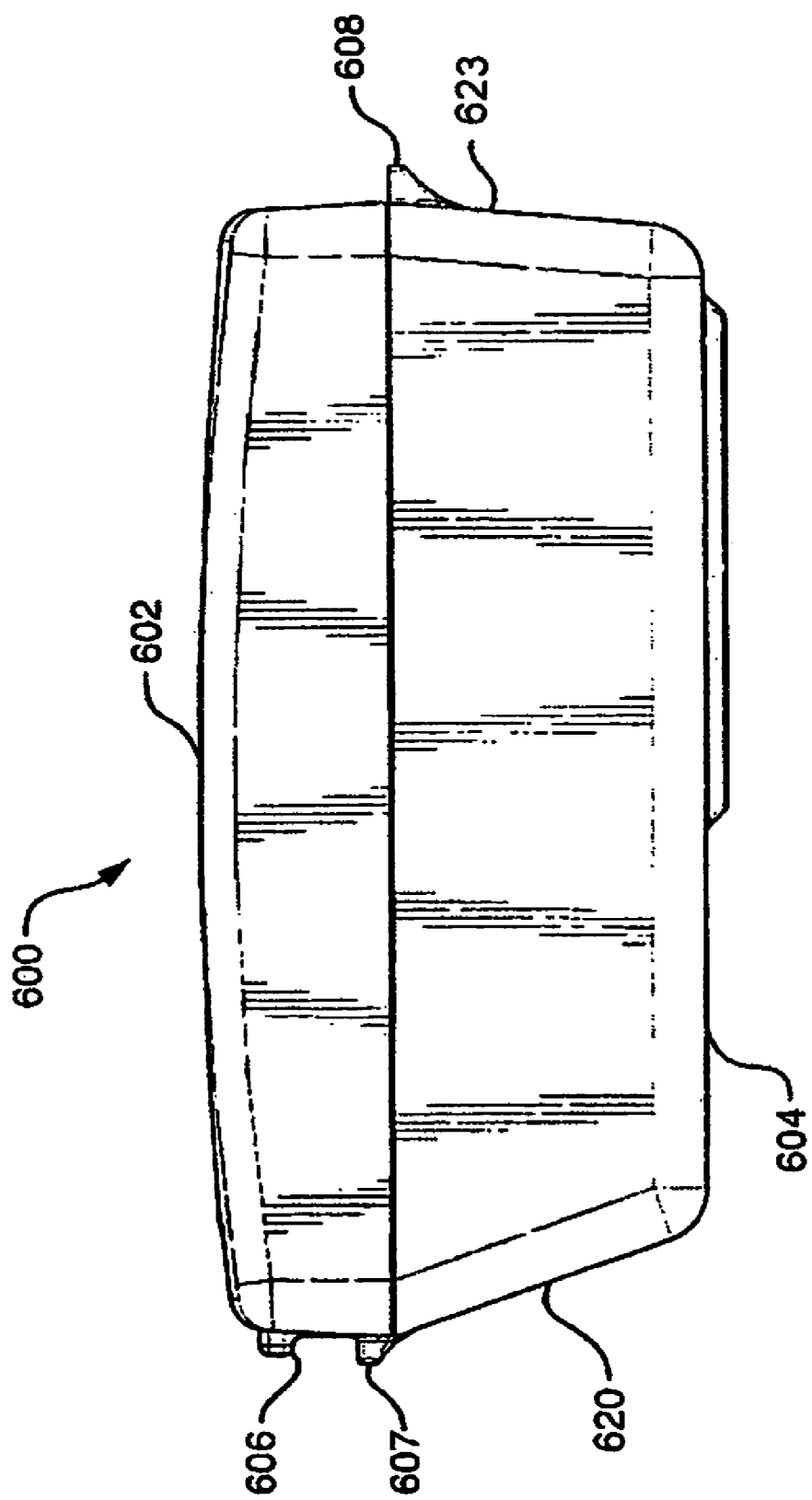
FIG. 9 is a side view of a battery in accordance with an embodiment of the present invention.
Figure 13:
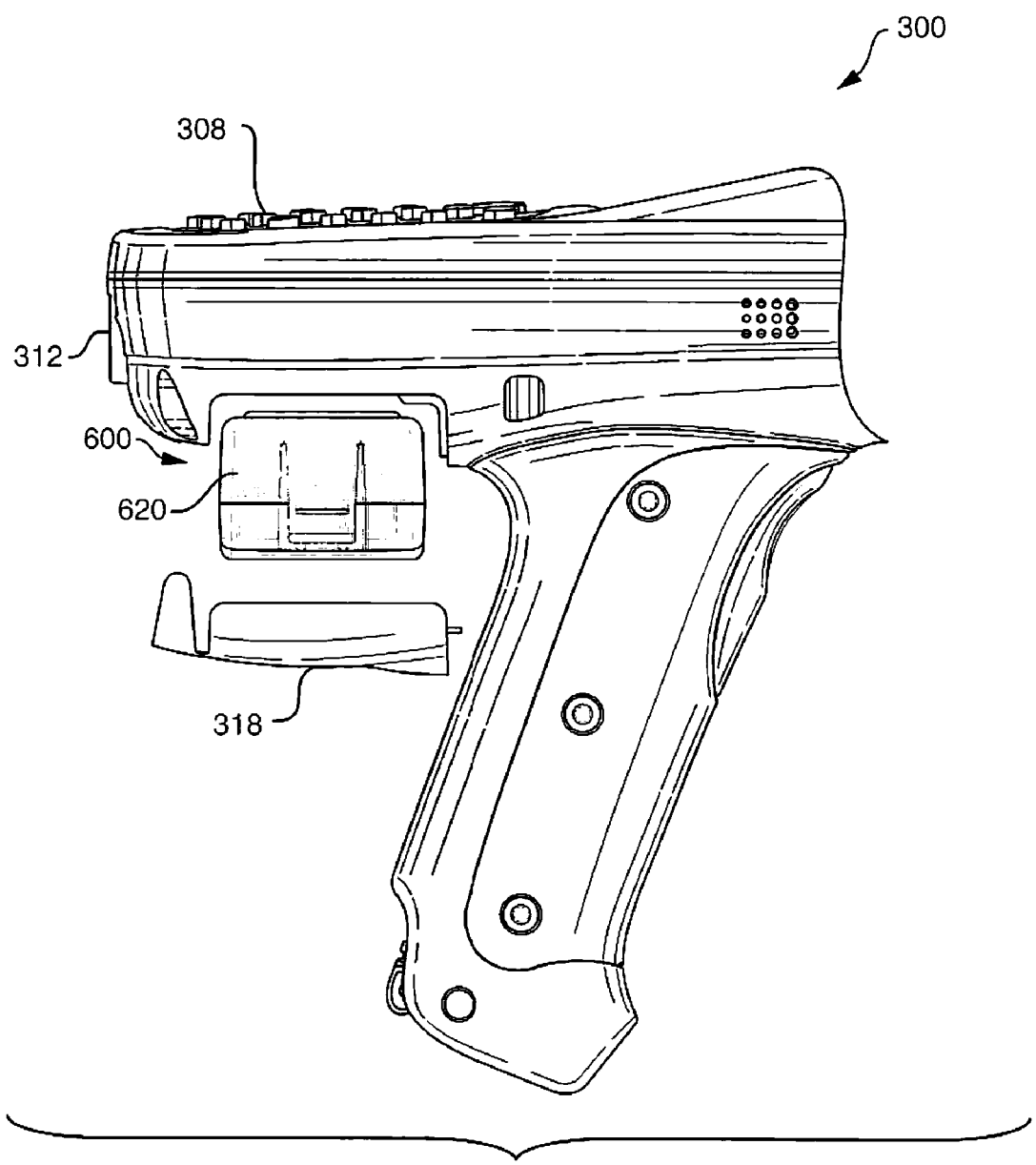
FIG. 13 is an assembly view of a PDT and battery in accordance with an embodiment of the present invention.

FIG. 13 s an assembly view of a PDT 300 and battery 600 in accordance with an embodiment of the present invention. The battery 600 is inserted into a battery well 1200 in the body of the PDT 300. As best illustrated in FIG. 9, the battery may be configured to assist the user in determining the correct orientation of the battery 600. In the example shown in FIG. 13, the end 620 of the battery 600 is nearest the viewer. In general, with the illustrated protrusion and latch configuration (best seen in FIG. 8), the user would insert the opposite end 623 into the battery well 1200. The battery 600 is then rotated into the well 1200 thereby engaging the first recess 1202 with the protrusion 608. Further rotation will flex the latch 606 allowing the battery 600 to seat in the well 1200, whereupon the second recess 1204 receives the protrusion 607 on the latch 606. The latch 606 will be biased into the well 1200 thereby securing the battery 600. At the same time biased electrical contacts 1208 (see FIG. 12) within the well 1200 will engage the electrical contacts 622n on the battery 600.

Figure 14:
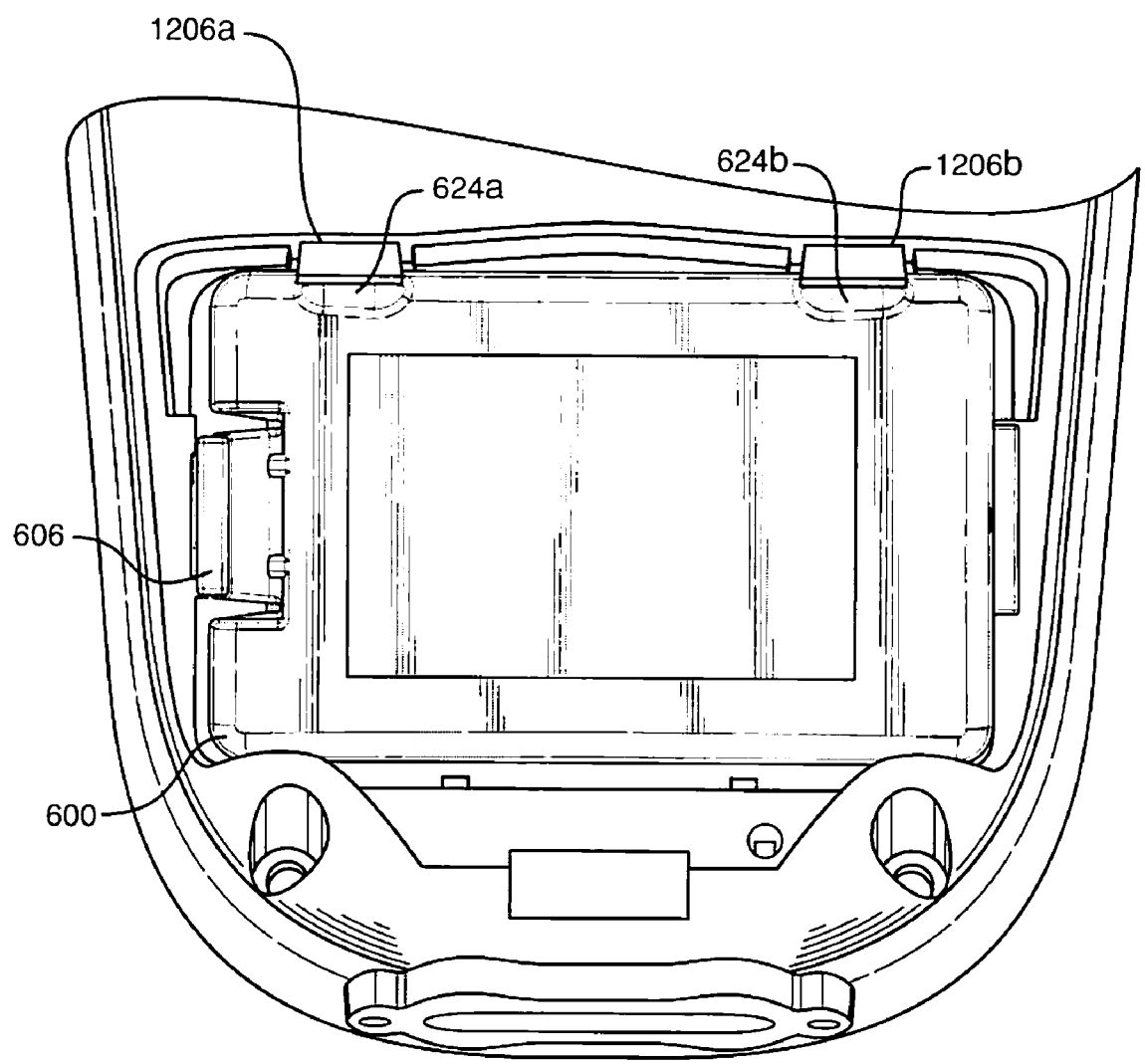
FIG. 14 is a partial bottom view of a PDT in accordance with an embodiment of the present invention.

FIG. 14 is a partial bottom view of a PDT 300 in accordance with an embodiment of the present invention. In particular FIG. 14 illustrates the well 1200 with a battery 600 seated therein.

Figure 15:
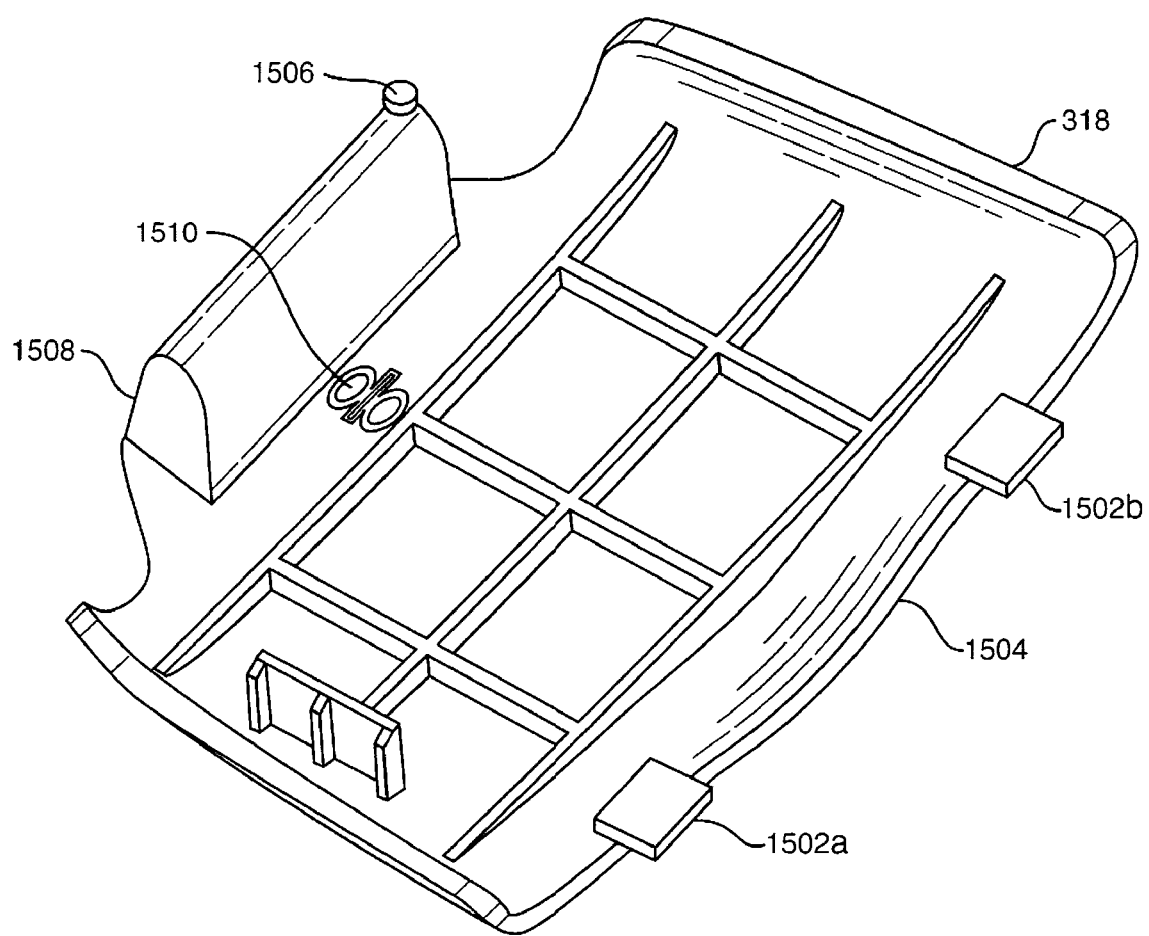
FIG. 15 is an isometric view of a battery access panel in accordance with an embodiment of the present invention.

FIG. 15 is an isometric view of a battery access panel 318 in accordance with an embodiment of the present invention. Of note are the tabs 1502a and 1502b which, when inserted into the housing 302, engage the reliefs 1206a and 1206b and rest within the recesses 624a and 624b of the battery 600. Of further interest is the blending of the battery access panel 318 with the housing 302, most evident in the raised section 1504. The battery access panel 318 also includes a latch 1508 that includes a protrusion 1506 for engaging the switch 1210 when the battery access panel 318 is engaged. Two holes, collectively referred to as element 1510, are provided to facilitate securing the strap 350 to the battery access panel 318. As the battery 600 and well 1200 are water resistant, the interface between the battery access panel 318 and the well 1200 need not be water resistant.

Although some embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A portable data terminal comprising:
   an elongated housing;
   a data collection device supported by the housing;
   a handle extending from the elongated housing, the handle having a trigger to activate the data collection device;
   a battery well formed in the elongated housing to the tear of an intersection between the handle and the elongated housing, the battery well extending traverse to a longitudinal axis of the housing; and
   a battery pack having a longitudinal axis that, when seated in the battery well extends traverse to a longitudinal axis of the housing.

2. A portable data terminal, as set forth in claim 1, further comprising:
   a battery access panel that covers the battery well.

3. A portable data terminal, as set forth in claim 2, wherein the battery pack further comprises a latch to secure the battery pack into the well.

4. A portable data terminal, as set forth in claim 3, wherein the battery access panel further comprises a latch to secure the battery access panel to the elongated housing such that to remove the battery, a user must first unlatch the battery access panel and subsequently unlatch the battery pack.

5. A portable data terminal, as set forth in claim 4, further comprising:
   a detector to indicate opening of the battery access panel.

6. A portable data terminal, as set forth in claim 5, wherein the latch of the battery access panel comprises an integrally molded latch that includes a protrusion on a support member thereof detectable by the detector.

7. A portable data terminal, as set forth in claim 6, further comprising a keypad having a plurality of keys and wherein the detector comprises a first key structurally similar to an underlying structure of keys on the keypad and wherein the protrusion on the support member of the battery access panel engages the first key when the battery access panel is secured by the elongated housing.

8. A portable data terminal, as set forth in claim 2, wherein the battery access panel further comprises at least one protrusion that engages at least one recess in the battery well to secure the battery pack in the well; and
   wherein the battery pack further comprises at least one recess that facilitates insertion of the at least one protrusion into the at least one recess in the battery well when the battery pack is secured in the battery well.

9. A portable data terminal, as set forth in claim 2 wherein the battery well is water resistant while the interface between the battery access panel and the elongated housing is not water resistant.

10. A portable data terminal, as set forth in claim 9, wherein the battery pack is water resistant.

11. A portable data terminal, as set forth in claim 2, wherein the battery access panel further includes feature that blends with the interface between the elongated housing and the handle.

12. A portable data terminal, as set forth in claim 2, further comprising:
    a strap connected between the handle and the battery access panel.

13. A portable data terminal, as set forth in claim 1, wherein the battery pack has a longitudinal axis that, when seated in the battery well, extends traverse to a longitudinal axis of the housing, the battery pack having a plurality of cells stacked in a generally vertical direction with respect to the overall orientation of the portable data terminal in use.

14. A portable data terminal, as set forth in claim 1, wherein the battery pack has an asymmetrical shape and the battery well has a complimentary shape so as to permit the insertion of the battery in a correct orientation.

15. A portable data terminal, as set forth in claim 14, wherein the battery pack comprises a first end, the first end comprising a slope at an obtuse angle to the battery bottom surface, and the battery pack further comprises a second end, the second end extending nearly perpendicular to the battery bottom surface.

16. A portable data terminal, as set forth in claim 15, wherein battery pack first end and second end are opposing ends of the battery pack.

17. A portable data terminal comprising:
    an elongated housing, the housing having a battery well that extends traverse to a longitudinal axis of the housing;
    a battery access panel having at least one protrusion that engages at least one relief in the battery well, and a latch opposite the at least one protrusion, the latch engaging a recess in the battery well to secure the battery into the well;
    a battery pack having a longitudinal axis that, when seated in the battery well, extends traverse to a longitudinal axis of the housing, the battery pack having at least one relief that, when seated in the battery well, aligns with the at least one relief in the well so as to facilitate insertion of the at least one protrusion into the at least one relief when the battery pack is inserted into the battery well; and
    handle integrated with and extending from the elongated housing.

18. A portable data terminal, as set forth in claim 17, wherein the battery pack has a longitudinal axis that, when seated in the battery well, extends traverse to a longitudinal axis of the housing, the battery pack having a plurality of cells stacked in a generally vertical direction with respect to the overall orientation of the portable data terminal in use.

19. A portable data terminal, as set forth in claim 17, wherein the battery pack has an asymmetrical shape and the battery well has a complimentary shape so as to permit the insertion of the battery in a correct orientation.

20. A portable data terminal, as set forth in claim 19, wherein the battery pack comprises a first end, the first end comprising a slope at an obtuse angle to the battery bottom surface, and the battery pack further comprises a second end, the second end extending nearly perpendicular to the battery bottom surface.

21. A portable data terminal, as set forth in claim 20, wherein the battery pack first end and second end are opposing ends of the battery pack.

22. A portable data terminal comprising:

an elongated housing, the housing having a battery well that extends traverse to a longitudinal axis of the housing;

a handle integrated with and extending from the elongated housing;

a battery access panel having a shape that blends with the housing including a hump that blends with the handle; and a battery pack having a longitudinal axis that, when seated in the battery well, extends traverse to a longitudinal axis of the housing.

23. A portable data terminal, as set forth in claim 22, wherein the battery pack has a longitudinal axis that, when seated in the battery well, extends traverse to a longitudinal, axis of the housing, the battery pack having a plurality of cells stacked in a generally vertical direction with respect to the overall orientation of the portable data terminal in use.

24. A portable data terminal, as set forth in claim 22, wherein the battery pack has an asymmetrical shape and the battery well has a complimentary shape so as to permit the insertion of the battery in a correct orientation.

25. A portable data terminal, as set forth in claim 24, wherein the battery pack comprises a first end, the first end comprising a slope at an obtuse angle to the battery bottom surface, and the battery pack further comprises a second end, the second end extending nearly perpendicular to the battery bottom surface.

26. A portable data terminal, as set forth in claim 25, wherein the battery pack first end and second end are opposing ends of the battery pack.

* * * * *